United States Patent
Tagi

(10) Patent No.: US 10,367,258 B2
(45) Date of Patent: Jul. 30, 2019

(54) ANTENNA DEVICE, WIRELESS COMMUNICATION APPARATUS, AND RADAR APPARATUS

(71) Applicant: Panasonic Intellectual Property Management Co., Ltd., Osaka (JP)

(72) Inventor: Hiroyoshi Tagi, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 560 days.

(21) Appl. No.: 15/088,288

(22) Filed: Apr. 1, 2016

(65) Prior Publication Data

US 2016/0344095 A1 Nov. 24, 2016

(30) Foreign Application Priority Data

May 19, 2015 (JP) ................. 2015-102179

(51) Int. Cl.
| | |
|---|---|
| *H01Q 1/40* | (2006.01) |
| *H01Q 1/42* | (2006.01) |
| *G01S 13/08* | (2006.01) |
| *G01S 13/58* | (2006.01) |
| *H01Q 15/02* | (2006.01) |
| *H01Q 15/08* | (2006.01) |

(Continued)

(52) U.S. Cl.
CPC ............ *H01Q 1/40* (2013.01); *G01S 13/08* (2013.01); *G01S 13/58* (2013.01); *H01Q 1/3233* (2013.01); *H01Q 1/42* (2013.01); *H01Q 15/02* (2013.01); *H01Q 15/08* (2013.01); *H01Q 19/06* (2013.01)

(58) Field of Classification Search
CPC ........ H01Q 1/42; H01Q 19/062; H01Q 15/08; H01Q 15/0013; H01Q 19/06; H01Q 25/00; H01Q 1/3233; H01Q 3/245; H01Q 1/405; H01Q 1/427; H01Q 1/2283; H01Q 15/0086; H01Q 1/22; G01S 13/931; G01S 7/4813; G01S 2007/027; G01S 2013/9375; G01S 2013/9389; G01S 7/03
See application file for complete search history.

(56) References Cited

U.S. PATENT DOCUMENTS

| | | | | |
|---|---|---|---|---|
| 5,955,752 A | * | 9/1999 | Fukaya | G01S 7/032 257/275 |
| 6,028,560 A | * | 2/2000 | Pfizenmaier | G01S 13/931 343/753 |

(Continued)

FOREIGN PATENT DOCUMENTS

| | | | | |
|---|---|---|---|---|
| EP | 0789421 A2 | * | 8/1997 | ........... G01S 13/426 |
| EP | 0 884 799 A2 | | 12/1998 | |

(Continued)

OTHER PUBLICATIONS

Extended European Search Report, dated Oct. 24, 2016, for corresponding EP Application No. 16163106.4-1811, 8 pages.

*Primary Examiner* — Olumide Ajibade Akonai
(74) *Attorney, Agent, or Firm* — Seed IP Law Group LLP

(57) ABSTRACT

An antenna device of the present disclosure includes: an antenna element that radiates a main lobe of a radio wave and one or more side lobes of the radio wave; and a radome through which the main lobe of the radio wave and the one or more side lobes of the radio wave. The radome has a focusing lens structure that focuses the main lobe of the radio wave and a diverging lens structure that diverges the one or more side lobes of the radio wave.

7 Claims, 9 Drawing Sheets

(51) Int. Cl.
*H01Q 19/06* (2006.01)
*H01Q 1/32* (2006.01)

(56) References Cited

U.S. PATENT DOCUMENTS

| | | | |
|---|---|---|---|
| 6,496,138 B1 | 12/2002 | Honma | |
| 6,592,788 B1* | 7/2003 | Yamamoto | H01Q 15/08 |
| | | | 264/321 |
| 6,674,392 B1* | 1/2004 | Schmidt | G01S 13/931 |
| | | | 342/70 |
| 6,717,544 B2* | 4/2004 | Nagasaku | G01S 7/032 |
| | | | 342/175 |
| 2007/0040727 A1* | 2/2007 | Matsuoka | G01S 7/4004 |
| | | | 342/70 |
| 2009/0207095 A1* | 8/2009 | Kimura | H01Q 15/08 |
| | | | 343/911 L |
| 2015/0377479 A1* | 12/2015 | Pescod | H01Q 1/007 |
| | | | 362/85 |

FOREIGN PATENT DOCUMENTS

| | | |
|---|---|---|
| JP | 11-004118 A | 1/1999 |
| JP | 11-231041 | 8/1999 |
| JP | 2001-127523 A | 5/2001 |
| JP | 2006-140956 | 6/2006 |

\* cited by examiner

ANTENNA DEVICE, WIRELESS COMMUNICATION APPARATUS, AND RADAR APPARATUS

BACKGROUND

1. Technical Field

The present disclosure relates to an antenna device including a radome, a wireless communication apparatus including such an antenna device, and a radar apparatus including such an antenna device.

2. Description of the Related Art

In recent years, rising attention has been paid to preventive safety technology to prevent accidents from occurring. For example, ACC (Adaptive Cruise Control), which uses 76-GHz millimeter-wave radar apparatuses, and ADAS (Advanced Driver Assistance System), which includes pre-crash safety systems, have been being included as standard equipment. In response to increasing demand for the preventive safety technology, the standardization of a new frequency band (79-GHz band) for radar apparatuses is being promoted. The new frequency band is expected to be available from fiscal 2015.

A millimeter-wave radar apparatus transmits millimeter radio waves (radar waves) in a desired direction, receives reflected waves from an object, and thereby detects in advance an object that may pose an impediment. In an on-board millimeter-wave radar apparatus, the transmission and reception of radar waves are performed, for example, by using a flat patch antenna or a slot antenna formed in a waveguide. A conventional antenna is installed on an exterior body of an automobile through which radar waves pass, in particular on an inner side of a bumper that faces in the direction that the automobile travels. Further, the inner side of the bumper of the automobile is not an enclosed space and therefore admits rain, dust, and the like. Therefore, a millimeter-wave radar apparatus is provided, for example, with a radome in a fixed part of the apparatus to which an antenna is attached. The radome stands in front of the antenna to protect the antenna. The radome has certain degrees of thickness and strength to ensure durability and sealing performance.

In a conventional millimeter-wave radar apparatus, radar waves radiated from an antenna element pass through a radome and are radiated toward an object to be searched for, and reflected waves from the object to be searched for pass through the radome again and arrive at the antenna element. During passage through the radome of the radar waves and the reflected waves from the object, some of the radar waves are reflected by an inner surface of the radome (a surface of the radome that is close to the antenna element) and an outer surface of the radome (a surface of the radome that is remote from the antenna element) due to the difference in wave impedance between the radome and an air layer. The reflected waves reflected by the radome affect a beam pattern of the radar waves. As a result, the conventional millimeter-wave radar apparatus induces a decrease in antenna gain and an increase in side lobe level. For this reason, Japanese Patents Nos. 4065268 and 3419675 propose methods for determining the thickness of a radome on the basis of the electrical length of the propagation path of radar waves in the radome.

The methods proposed in Japanese Patents Nos. 4065268 and 3419675 are effective in a case where the direction of main lobe radiation of radar waves is fixed. However, the methods proposed in Japanese Patents Nos. 4065268 and 3419675 are not effective in a case where the direction of main lobe radiation of radar waves is changed. This is because radar waves are such that the electrical length of the propagation path of the radar waves in the radome varies depending on the angle at which the radar waves enter the radome. Therefore, in a case where the direction of main lobe radiation of radar waves is changed, a radome whose thickness has been determined by either of the methods proposed in Japanese Patents Nos. 4065268 and 3419675 has difficulty in restraining a reflection loss of radio waves from being caused by the radome.

Therefore, an antenna device is required to prevent a decrease in antenna gain and an increase in side lobe level from being caused by a radome.

SUMMARY

One non-limiting and exemplary embodiment provides an antenna device that can prevent a decrease in antenna gain and an increase in side lobe level from being caused by a radome.

In one general aspect, the techniques disclosed here future an antenna device according to an aspect of the present disclosure includes: an antenna element; and a radome through which a main lobe of radio waves and a side lobe of radio waves from the antenna element pass, wherein the radome includes a focusing lens structure that focuses the main lobe of radio wave passing through the radome, and a diverging lens structure that diverges the side lobe of radio wave passing through the radome.

The antenna device according to the aspect of the present disclosure can prevent a decrease in antenna gain and an increase in side lobe level from being caused by the radome.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

First Embodiment

An antenna device according to a first embodiment is described below with reference to the drawings.

Figure 1:
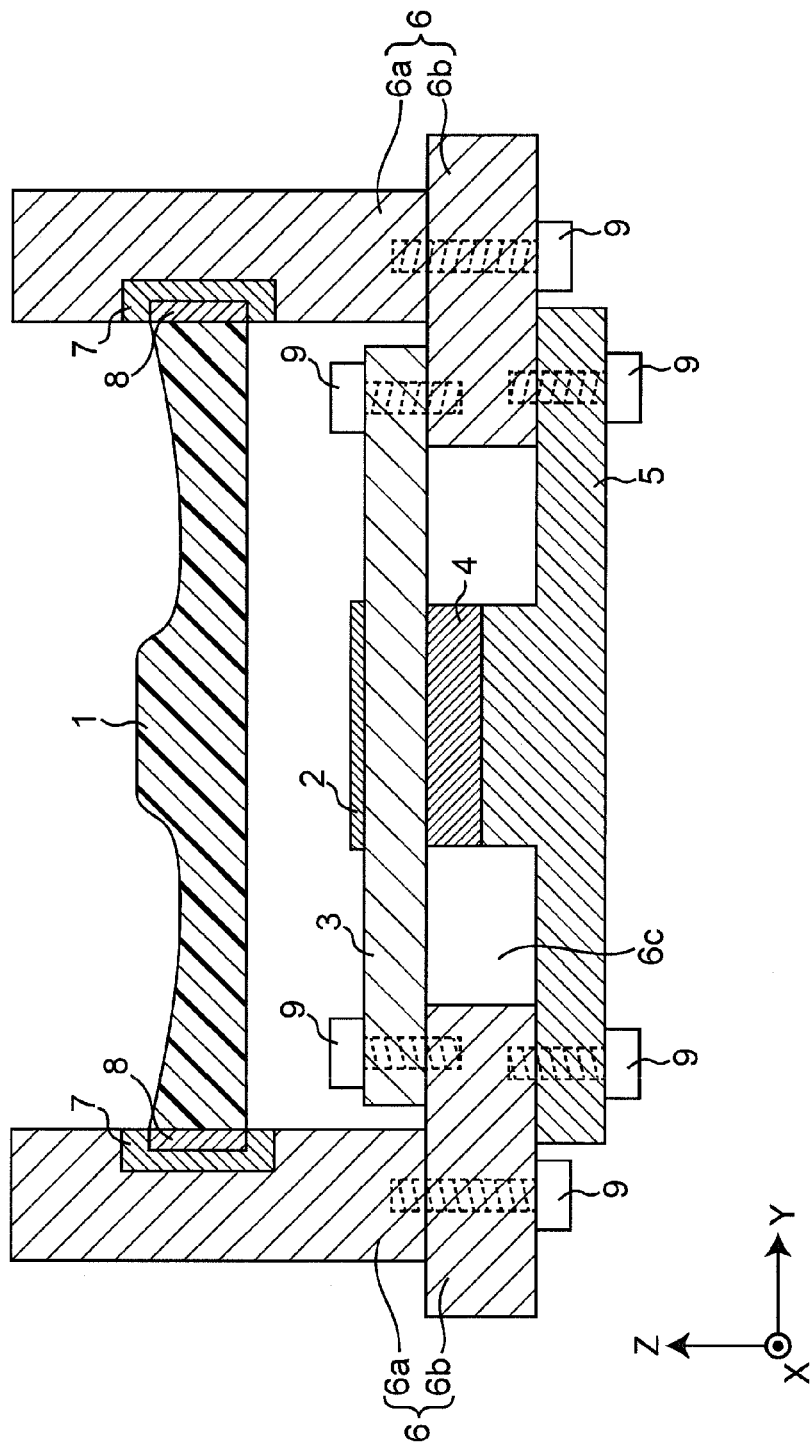
FIG. 1 is a cross-sectional view showing a configuration of an antenna device 10 according to a first embodiment of the present disclosure.
Figure 2:
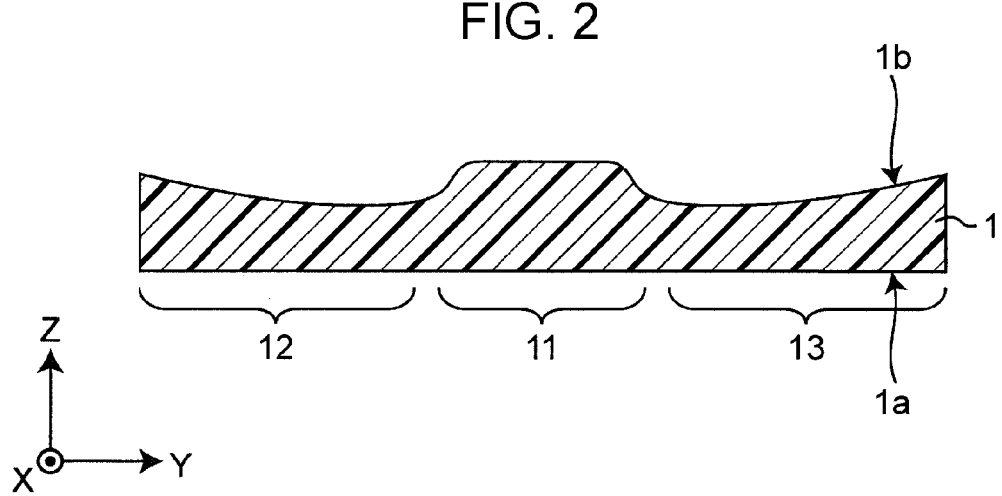
FIG. 2 is a cross-sectional view showing a structure of a radome 1 shown in FIG. 1.
Figure 3:
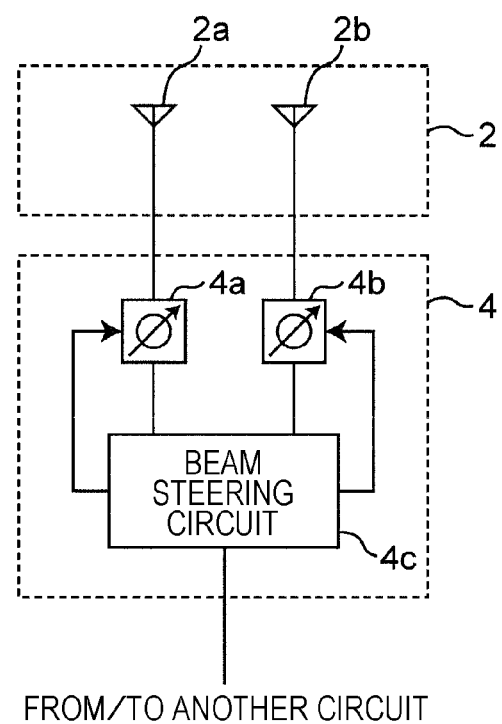
FIG. 3 is a block diagram showing a configuration of an antenna element 2 and an antenna circuit 4 shown in FIG. 1.

FIG. 1 is a cross-sectional view showing a configuration of an antenna device 10 according to the first embodiment. FIG. 2 is a cross-sectional view showing a structure of a radome 1 shown in FIG. 1. FIG. 3 is a block diagram showing a configuration of an antenna element 2 and an antenna circuit 4 shown in FIG. 1. The antenna device 10 is used, for example, in an on-board millimeter-wave radar apparatus.

As shown in FIG. 1, the antenna device 10 includes an antenna element 2 that radiates a main lobe of radio wave in a predetermined direction and a radome 1 through which the main lobe of radio waves and a side lobe of radio waves radiated from the antenna element 2 pass. An X-Y plane is a plane of an antenna substrate 3. A Z-axis direction is a thickness direction of the antenna substrate 3.

As shown in FIG. 2, the radome 1 includes a focusing lens structure 11 that focuses the main lobe of radio waves passing through the radome 1 and diverging lens structures 12 and 13 that diverge the side lobe of radio waves passing through the radome 1.

The antenna device 10 includes the antenna substrate 3. The antenna element 2 is formed on an upper surface of the antenna substrate 3. An antenna circuit 4 is mounted on a lower surface of the antenna substrate 3. In FIG. 3, the antenna element 2 is a feed antenna including antenna element portions 2a and 2b. The antenna circuit 4 includes phase shifters 4a and 4b and a beam steering circuit 4c. By the beam steering circuit 4c changing the phase-shift amounts of the phase shifters 4a and 4b, the antenna element 2 can change the direction of main lobe radiation within a range of plus or minus few degrees (e.g., ±2 degrees) in a Y-Z plane of FIG. 1.

The antenna circuit 4 may be an integrated circuit such as a system LSI.

The antenna device 10 operates, for example, in a millimeter-wave band or submillimeter-wave band within a range of 50 to 60 GHz. The antenna device 10 may transmit and receive radar waves. Further, the antenna device 10 may either transmit or receive or both transmit and receive other radio signals.

In FIG. 1, a housing 6 includes a frame 6a and a bottom 6b. The bottom 6b has an opening 6c bored through the bottom 6b from an upper surface of the bottom 6b to a lower surface of the bottom 6b. The frame 6a is provided on the upper surface of the bottom 6b to surround the opening 6c. The antenna substrate 3 is provided on the upper surface of the bottom 6b. Specifically, an outer peripheral portion of the lower surface of the antenna substrate 3 is fixed in an area around the opening 6c on the upper surface of the bottom 6b so that the antenna circuit 4 mounted on the lower surface of the antenna substrate 3 is located within the opening 6c. The frame 6a is fixed on the upper surface of the bottom 6b, for example, by screws 9 to surround the antenna substrate 3.

A heat sink 5 is provided on the lower surface of the bottom 6b to protect the antenna substrate 3 and dissipate heat from the antenna circuit 4. The heat sink 5 closes the opening 6c, makes contact with the antenna circuit 4, and is fixed on the lower surface of the bottom 6b, for example, by screws 9. To protect the antenna substrate 3, the radome 1 is located in front of the antenna element 2 at a predetermined distance from the antenna element 2 in the direction of radiation. The radome 1 is attached to the frame 6a by a fixing member 7 such as rubber. A wave absorber 8 is provided in at least part of a space between the fixing member 7 and the radome 1.

The antenna substrate 3 is provided in an enclosed space (also referred to as "antenna protection space") formed by the housing 6, the heat sink 5, which closes the opening 6c of the bottom 6b of the housing 6, and the radome 1, which covers the front of the antenna element 2. Therefore, the antenna substrate 3 is protected. The antenna device 10, which is used in an on-board radar apparatus, is required to withstand severe external environments including being used under adverse weather conditions such as rainfalls or snowfalls, being exposed to a physical impact such as a collision with a pebble while running, and the like. Therefore, the housing 6, the radome 1, and the like, which protect the antenna substrate 3, are required to have a certain or higher level of mechanical strength in addition to sealing performance that prevents dust penetration. In the present specification, when mounted in an automobile, the antenna device 10 needs only have sealing performance that can prevent moisture intrusion, dust penetration, and the like. For example, the antenna device 10 does not need to have such airtightness as to maintain a vacuum state.

Figure 4:
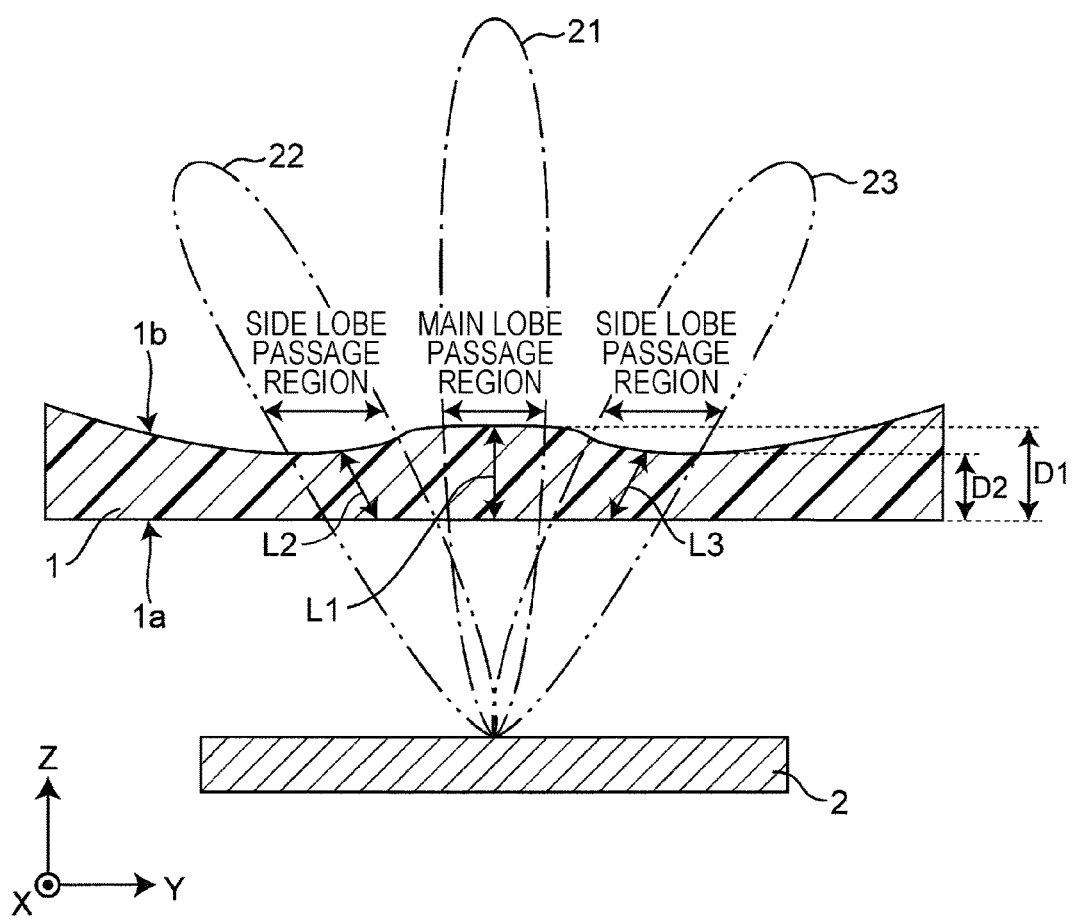
FIG. 4 is a diagram explaining a first method for reducing a reflection loss with the radome 1 shown in FIG. 1.
Figure 5:
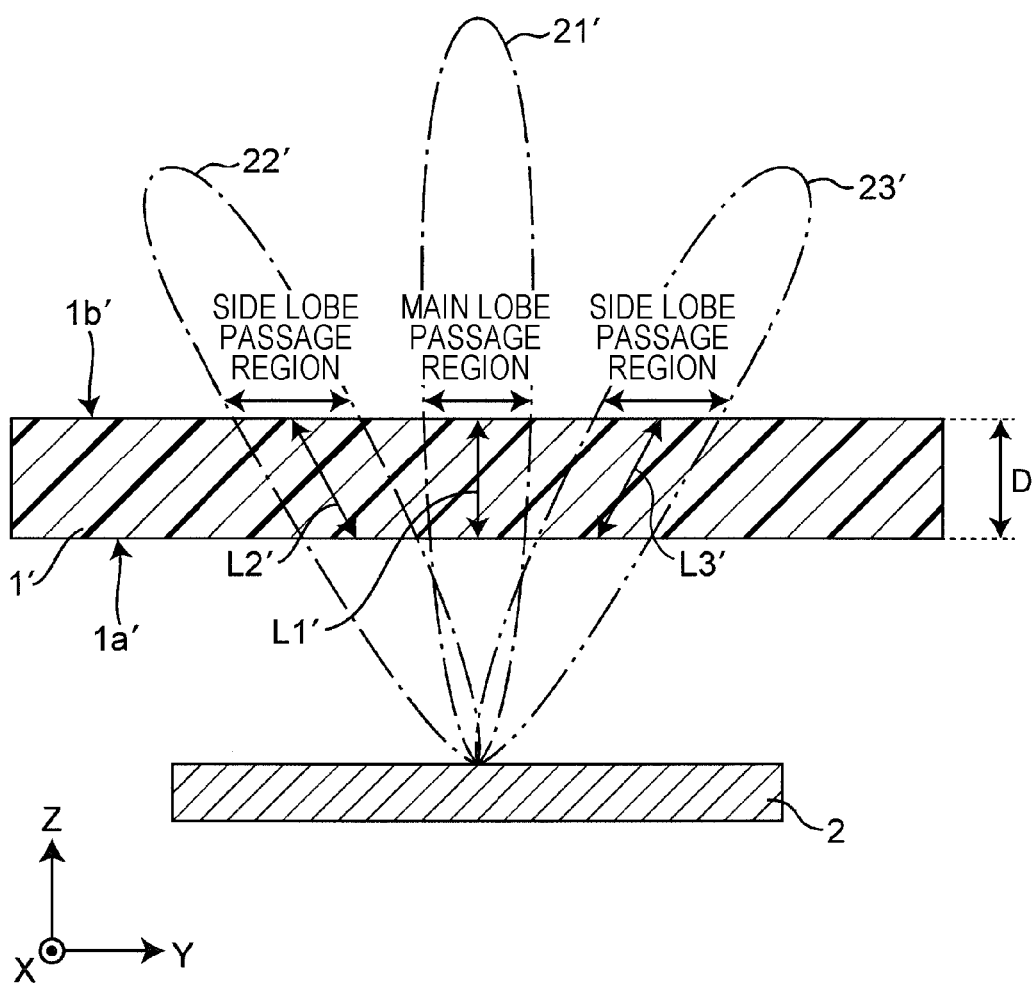
FIG. 5 is a diagram explaining the generation of a reflection loss of radio waves due to a radome 1' according to an comparative example.

Since radio waves that are radiated from the antenna element 2 pass through the radome 1, which covers the front of the antenna element 2, the antenna device 10 needs to reduce a reflection loss of the radio waves that is caused by the radome 1. For this purpose, as shown in FIG. 2, the radome 1 includes the focusing lens structure 11, which is provided so that radio waves that are transmitted pass through the radome 1, and the diverging lens structures 12 and 13, which are provided to diverge and reflect the radio waves that are transmitted. FIGS. 4 and 5 explain a method for reducing a reflection loss of radio waves with the focusing lens structure 11 and the diverging lens structures 12 and 13.

FIG. 4 is a diagram explaining a first method for reducing a reflection loss with the radome 1 shown in FIG. 1. The focusing lens structure 11 is formed in a partial region (main lobe passage region) of the radome 1 through which a substantially large portion of a main lobe 21 of radio waves that is radiated from the antenna element 2 passes. Meanwhile, the diverging lens structures 12 and 13 are formed in partial regions(side lobe passage regions) of the radome 1 through which substantially large portions of side lobes 22 and 23 (second largest lobes after the main lobe 21) of radio waves that are radiated from the antenna element 2 pass. Each of the side lobes 22 and 23 has an angle, for example, of 10 to 20 degrees with respect to the main lobe 21. The partial regions of the radome 1 that form the focusing lens structure 11 and the diverging lens structures 12 and 13 are determined, specifically, in consideration of the directivity of the antenna element 2. The focusing lens structure 11 is formed, for example, in a partial region (main lobe passage region) of the radome 1 through which radio waves propagating in a direction included in a half-value angle of the main lobe 21 pass. The diverging lens structures 12 and 13 are formed, for example, in partial regions (side lobe passage regions) of the radome 1 through which radio waves propagating in directions included in half-values angles of the side lobes 22 and 23 pass.

For this reason, in the case of a change in the direction of main lobe radiation (in a y-axis direction), a substantially large portion of the main lobe 21 and substantially large portions of the side lobes 22 and 23 pass through the main lobe passage region and the side lobe passage regions, respectively.

The focusing lens structure 11 focuses radio waves that are transmitted in the direction (z-axis positive direction) of main lobe radiation from the antenna element 2. This allows the antenna device 10 to improve the main lobe gain. Meanwhile, the diverging lens structures 12 and 13 diverges radio waves that are transmitted in the direction (z-axis positive direction) of side lobe radiation from the antenna element 2. This allows the antenna device 10 to prevent an increase in side lobe level.

The antenna device 10 includes the radome 1, and the radome 1 includes the focusing lens structure 11 and the diverging lens structures 12 and 13. In the case of a change in the direction of transmission of the main lobe 21, the antenna device 10 can improve the main lobe gain and prevent an increase in side lobe level.

FIG. 5 is a diagram explaining the generation of a reflection loss of radio waves due to a radome 1' according to an comparative example. The radome 1' has no such focusing lens structure or diverging lens structures 12 and 13 as those shown in FIG. 2. According to Japanese Patents Nos. 4065268 and 3419675, determination of the thickness D of a main lobe passage region on the basis of the electrical length of the propagation path of a main lobe 21' of radio waves in the radome 1' establishes a relationship L1' L2' L3', where L1' is the propagation path length of the main lobe 21', L2' is the propagation path length of a side lobe 22', and L3' is the propagation path length of a side lobe 23'. In FIG. 5, the side lobes 22' and 23' of radio waves, as well as the main lobe 21' of radio waves, pass through the radome 1' with almost no reflection. This causes the antenna device to increase in side lobe level. Further, in FIG. 5, in the case of a change in the direction of main lobe radiation, the radome 1' has difficulty in restraining a reflection loss of radio waves from being caused by the radome 1'.

As described above, the antenna device 10 according to the first embodiment provides the radome 1 with the focusing lens structure 11. This causes the antenna device 10 to improve in antenna gain, as the focusing lens structure 11 focuses the main lobe 21 of radio waves and narrows down the beam pattern. Further, the antenna device 10 provides the radome 1 with the diverging lens structures 12 and 13. This allows the antenna device 10 to restrain an increase in side lobe level in the case of a change in the direction of main lobe radiation, as the diverging lens structures 12 and 13 diverge the side lobes 22 and 23 of radio waves.

Figure 6:
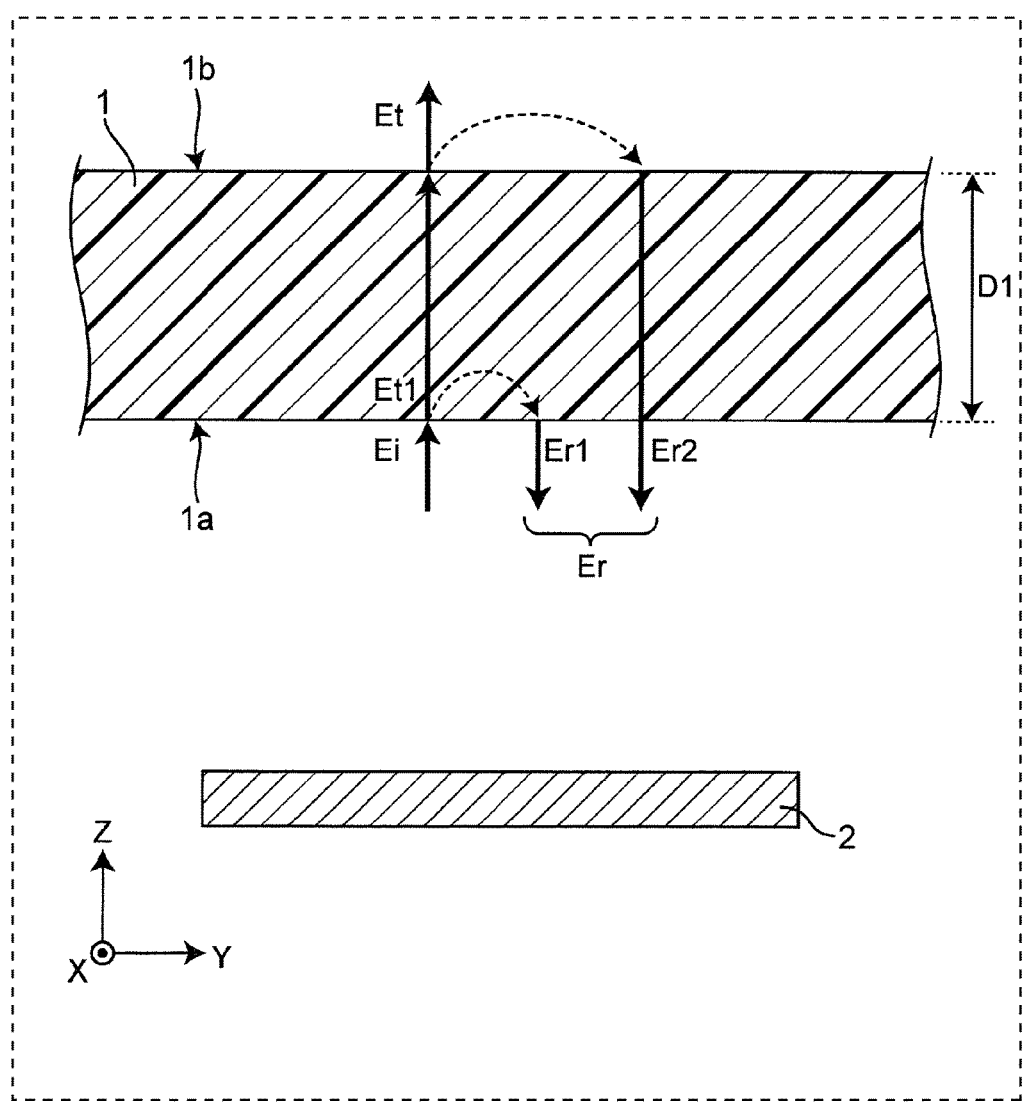
FIG. 6 is a diagram explaining a second method for reducing a reflection loss with the radome 1 shown in FIG. 1.

Next, a second method for reducing a reflection loss of radio waves is described with reference to FIG. 6. FIG. 6 is a diagram explaining the second method for reducing a reflection loss with the radome 1 shown in FIG. 1.

In FIG. 6, the radome 1 is provided to face parallel to the antenna element 2 (or the surface of the antenna substrate 3 on which the antenna element 2 is formed). The radome 1 has a first surface 1a (a surface that is close to the antenna element 2) and a second surface 1b (a surface that is remote from the antenna element 2). The first surface 1a is a boundary surface between the radome 1 and a free space. Radio waves radiated from the antenna element 2 enter the radome 1 through the first surface 1a, pass through the radome 1, and then exit the radome 1 through the second surface 1b.

Note here that the radome 1 is made, for example, of synthetic resin. The radome 1 has the following parameters: the relative dielectric constant $\varepsilon$, the guide wavelength $\lambda$, the thickness D1 of the focusing lens structure 11, the thickness D2 of each of the diverging lens structures 12 and 13, and the wave number k ($=2\pi/\lambda$). The guide wavelength $\lambda$ is given by $\lambda=\lambda_0/\varepsilon^{1/2}$, where $\lambda_0$ is the wavelength in vacuum. Coefficients of reflection on the first and second surfaces 1a and 1b, respectively, of radio waves that are radiated from the antenna element 2 are both $\Gamma$.

Next, thought is given to reflected waves from the first surface 1a and the second surface 1b. In the case of radio waves radiated from the antenna element 2, a first reflected wave reflected by the first surface 1a and a second reflected wave reflected by the second surface 1b are combined with each other at the first surface 1a and reenter the antenna element 2. Therefore, the first reflected wave and the second reflected wave theoretically have no influence on the antenna element 2, as the first reflected wave and the second reflected wave are combined with each other in opposite phase to each other (phase difference $\pi$). The following gives more concrete descriptions with reference to FIGS. 4 to 6.

First, in a case where a plane wave Ei radiated from the antenna element 2 vertically enters the radome 1 through the first surface 1a, the wave impedance of the radome 1 is different from the wave impedance of air. Therefore, a portion of the plane wave Ei is reflected by the first surface 1a. A first reflected wave Er1 reflected by the first surface 1a is expressed by the following equation:

$$Er1 = Ei \cdot \Gamma \quad (1)$$

Further, a transmitted component Et1 of the plane wave Ei, which has vertically entered the radome 1 through the first surface 1a, propagates through the radome 1 and is expressed by the following equation:

$$Et1 = Ei \cdot (1-|\Gamma|^2)^{1/2} \quad (2)$$

In a case where the transmitted component Et1 has arrived at the second surface 1b, there is a discontinuous change in dielectric constant on the second surface 1b. Therefore, a portion of the transmitted component Et1 is reflected by the second surface 1b. A second reflected wave Er2 reflected by the second surface 1b propagates through the radome 1 and arrives at the first surface 1a. The second reflected wave Er2 is expressed by the following equation:

$$Er2 = -Ei \cdot \Gamma \cdot (1-|\Gamma|^2)^{1/2} \cdot e^{-2j\beta}$$

Note here that in a case where $|\Gamma|^2 \ll 1$ holds, the second reflected wave Er2 is approximated by the following equation:

$$Er2 \approx -Ei \cdot \Gamma \cdot e^{-2j\beta} \quad (3)$$

Note, however, that in Equation (3), the electrical length $\beta$ of the propagation path of radio waves in the radome 1 is expressed by the following equation:

$$\beta = k \cdot D1$$

Therefore, the combined reflected wave Er at the first surface 1a of the radome 1 is expressed by the following equation:

$$Er = Er1 + Er2 = Ei \cdot \Gamma \cdot (1-e^{-2j\beta}) \quad (4)$$

As is evident from Equation (4), in a case where $e^{-2j\beta}$ is $-1$, i.e., in a case where the electrical length $\beta$ is an odd multiple of $\lambda/4$ (the phase difference is $\pi/2$), the first reflected wave Er1 and the second reflected wave Er2 are combined with each other as waveforms that are in phase with each other, so that the combined reflected wave Er becomes the maximum.

Further, in a case where $e^{-2j\beta}$ is +1, i.e., in a case where 13 is an integer multiple of $\lambda/2$ (the phase difference is $\pi$), $(1-e^{-2j\beta})=0$, so that the combined reflected wave Er is minimized.

The gain of the antenna device 10 is improved by setting the thickness D1 of the focusing lens structure 11 of the radome 1 so that the first reflected wave Er1 and the second reflected wave Er2 can be combined as waveforms that are opposite in phase to each other. By setting the thickness D1 of the focusing lens structure 11 of the radome 1 so that the electrical length $\beta$ of the propagation path of radio waves in the radome 1 is an integer multiple of $\lambda/2$, the combined reflected wave Er, which is a combination of the first reflected wave Er1 and the second reflected wave Er2, is minimized.

However, in a case where the thickness of the radome 1 (the focusing lens structure 11 and the diverging lens structures 12 and 13) to D1 so that the electrical length $\beta$ of the propagation path of radio waves in the radome 1 is uniformly an integer multiple of $\lambda/2$ over the entire range of the antenna element 2 including the main lobe 21 and the side lobes 22 and 23, not only the combined reflected wave Er of the main lobe 21 but also the combined reflected waves Er of the side lobes 22 and 23 are minimized. This causes an increase in side lobe level. Further, a change in the direction of main lobe radiation causes a change in the propagation path of radio waves in the radome 1 and therefore also causes a change in the physical length and electrical length $\beta$ of the propagation path of radio waves. Therefore, in the case of a change in the direction of main lobe radiation, the combined reflected wave Er is not minimized in the structure in which the thickness of the radome 1 (the focusing lens structure 11 and the diverging lens structures 12 and 13) to D1 so that the electrical length $\beta$ is uniformly an integer multiple of $\lambda/2$.

Therefore, the focusing lens structure 11 and the diverging lens structures 12 and 13 are structured in the following manners. The thickness D1 of the focusing lens structure 11 is set so that the first reflected wave Er1 and the second reflected wave Er2 are substantially opposite in phase to each other, the first reflected wave Er1 being generated when the main lobe 21 of radio waves radiated from the antenna element 2 is reflected by the first surface 1a, the second reflected wave Er2 being generated when the main lobe 21 of radio waves radiated from the antenna element 2 passes through the first surface 1a, is reflected by the second surface 1b, and passes through the first surface 1a again. For this reason, the thickness D1 of the focusing lens structure 11 (i.e., the propagation path length L1 of radio waves in the main lobe passage region) is set, for example, to such a value that the electrical length $\beta$ of the propagation path of radio waves in the main lobe passage region is close to an integer multiple of $\lambda/2$.

The thickness D2 of each of the diverging lens structures 12 and 13 is set so that the first reflected wave Er1 and the second reflected wave Er2 are substantially in phase with each other, the first reflected wave Er1 being generated when the side lobes 22 and 23 of radio waves radiated from the antenna element 2 are reflected by the first surface 1a, the second reflected wave Er2 being generated when the side lobes 22 and 23 of radio waves radiated from the antenna element 2 pass through the first surface 1a, are reflected by the second surface 1b, and pass through the first surface 1a again. For this reason, the thickness D2 of each of the diverging lens structures 12 and 13 (i.e., each of the propagation path lengths L2 and L3 of radio waves in the side lobe passage regions) is set, for example, to such a value that the electrical length $\beta$ of each of the propagation paths of radio waves in the side lobe passage regions is close to an odd multiple of $\lambda/4$ (the phase difference is $\pi/2$).

In the main lobe 21, the combined reflected wave Er of Equation (4) satisfies the following equation:

$$\begin{aligned} Er &= Er1 + Er2 \\ &= Ei \cdot \Gamma \cdot (1 - e^{-2j\beta}) \\ &= Ei \cdot \Gamma \cdot (1 - 1) \\ &= 0 \end{aligned} \tag{5}$$

Further, in the side lobes 22 and 23, the combined reflected wave Er of Equation (4) satisfies the following equation:

$$\begin{aligned} Er &= Er1 + Er2 \\ &= Ei \cdot \Gamma \cdot (1 - e^{-2j\beta}) \\ &= Ei \cdot \Gamma \cdot (1 + 1) \\ &= 2 \cdot Ei \cdot \Gamma \end{aligned} \tag{6}$$

This allows the antenna device 10 to achieve an ideal state in which a reflection loss of radio waves is cut to zero in the main lobe passage region and radio waves are totally reflated in the side lobe passage regions.

The thickness D1 of the focusing lens structure 11 may be set so that the phase difference between the first reflected wave and the second reflected wave falls within a range of $0.9\pi$ to $1.1\pi$. The thickness D2 of each of the diverging lens structures 12 and 13 may be set so that the phase difference between the first reflected wave and the second reflected wave is not smaller than $0.3\pi$ and not larger than $0.8\pi$.

On the basis of the foregoing descriptions, a specific configuration for reducing a reflection loss and an absorption loss of radio waves that are caused by the radome 1 is described.

From the foregoing descriptions, principally, the thickness D1 of the focusing lens structure 11 is set to such a value that the electrical length $\beta$ of the propagation path of radio waves in the main lobe passage region is close to an integer multiple of $\lambda/2$. Further, the thickness D2 of each of the diverging lens structures 12 and 13 is set to such a value that the electrical length $\beta$ of each of the propagation paths of radio waves in the side lobe passage regions is close to an odd multiple of $\lambda/4$ (the phase difference is $\pi/2$). This allows the antenna device 10 to reduce a reflection loss of radio waves in the main lobe 21 and increase a reflection loss of radio waves in the side lobes 22 and 23. Further, the focusing lens structure 11 and the diverging lens structures 12 and 13 bring about a refraction effect that focuses the main lobe 21 and diverges the first side lobes 22 and 23. Therefore, the antenna device 10 is expected to improve in antenna gain and further decrease in the levels of the side lobes 22 and 23.

Based on this idea, the radome 1 includes the focusing lens structure 11, which focuses the main lobe 21 of radio waves that is radiated and narrows down the beam pattern, and the diverging lens structures 12 and 13, which diverge side lobe beam patterns. The focusing lens structure 11 is formed in the main lobe passage region, and the diverging lens structures 12 and 13 are formed in the side lobe passage regions.

Next, simulation results of the antenna device 10 shown in FIG. 1 are described with reference to FIGS. 7 and 8.

Figure 7:
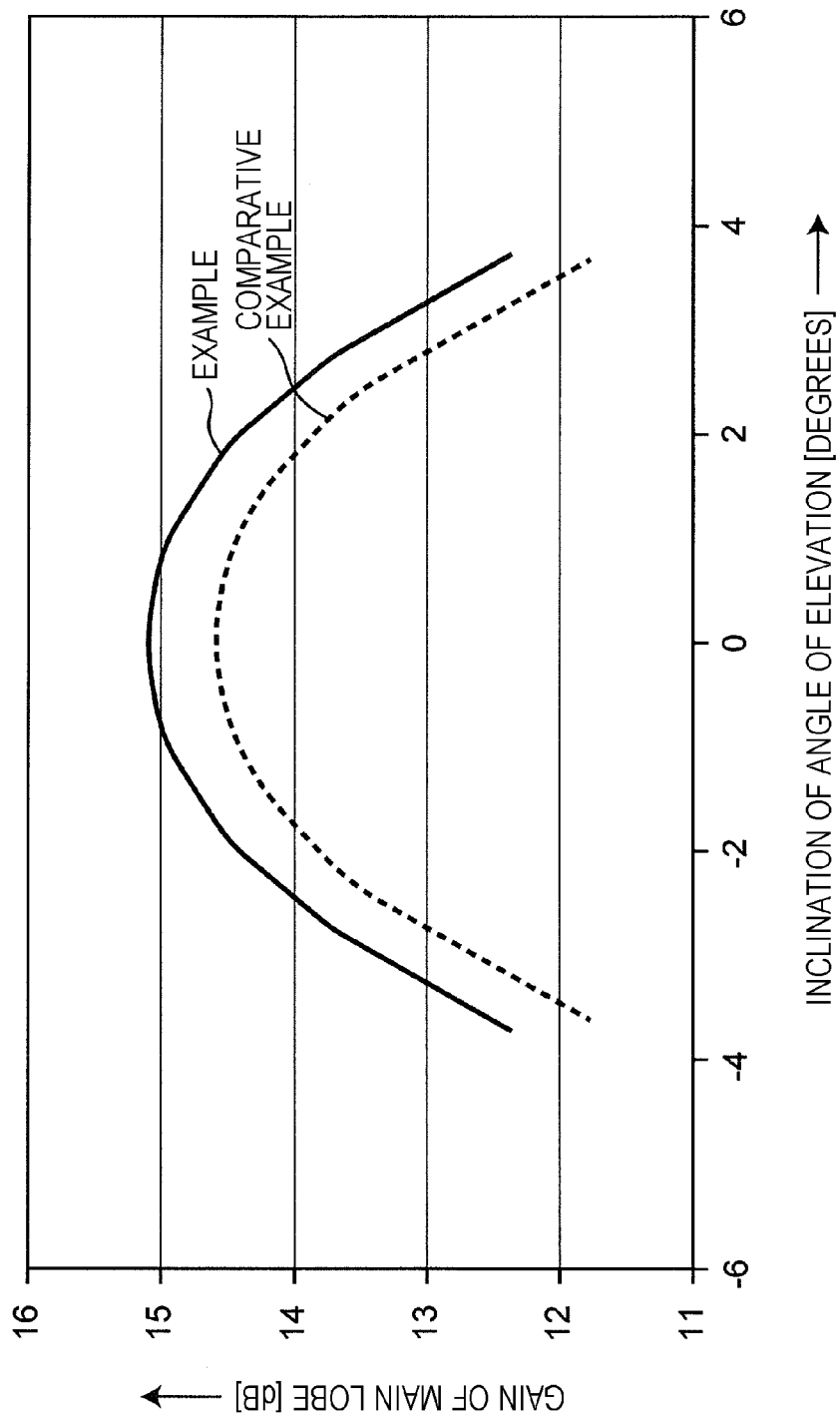
FIG. 7 is a graph showing the gain of a main lobe with respect to the inclination of an angle of elevation as simulation results according to an antenna device 10 according to an example of the first embodiment of the present disclosure and an antenna device of a comparative example.

FIG. 7 is a graph showing the gain of a main lobe with respect to the inclination of an angle of elevation (change in the direction of main lobe radiation) as simulation results according to an antenna device 10 according to an example of the first embodiment and an antenna device of a comparative example. FIG. 8 is a graph showing the gain of a side lobe with respect to the inclination of an angle of elevation (change in the direction of side lobe radiation) as simulation results according to the antenna device 10 according to the example of the first embodiment of the present disclosure and the antenna device of the comparative example. In FIGS. 7 and 8, the direction of main lobe radiation sets the direction parallel to the Z-axis direction of FIG. 1 to 0 degree, and the direction of side lobe radiation was changed within a range of ±4 degrees (angle of elevation) in the Y-Z plane.

The antenna device 10 (denoted by "EXAMPLE" in FIGS. 7 and 8) included a radome 1 including a focusing lens structure 11 having a thickness of 1.2 mm and diverging lens structures 12 and 13 each having a thickness of 0.8 mm. In the simulations shown in FIGS. 7 and 8, the antenna device of the example was configured such that the electrical length $\beta$ of the propagation path the main lobe 21 of radio waves that passes through the focusing lens structure 11 was set to a value that is close to an integer multiple of $\lambda/2$ (the phase difference is $\pi$) and the electrical length $\beta$ of each of the propagation paths the side lobes 22 and 23 of radio waves that pass through the lens diverging structures 12 and 13 was set to a value that is close to an odd multiple of $\lambda/4$ (the phase difference is $\pi/2$). The antenna device of the comparative example included a radome 1' having a uniform thickness of 1.2 mm, and the radomes 1 and 1' were made of a material having a relative dielectric constant $\epsilon$ of 3.0. The distance from the antenna element 2 to the radome 1 in the antenna device 10 of the example and the distance from the antenna element 2 to the radome 1' in the antenna device of the comparative example were both 1.6 mm, and the antenna elements 2 transmitted radio waves of 79 GHz.

In FIG. 7, in a case where the inclination of the angle of elevation is 0 degree, the main lobe gain of the antenna device of the comparative example is 14.6 dB, and the main lobe gain of the antenna device 10 of the example is 15.1 dB. The main lobe gain of the antenna device 10 of the example was higher in performance by 0.5 dB than the main lobe gain of the antenna device of the comparative example.

Figure 8:
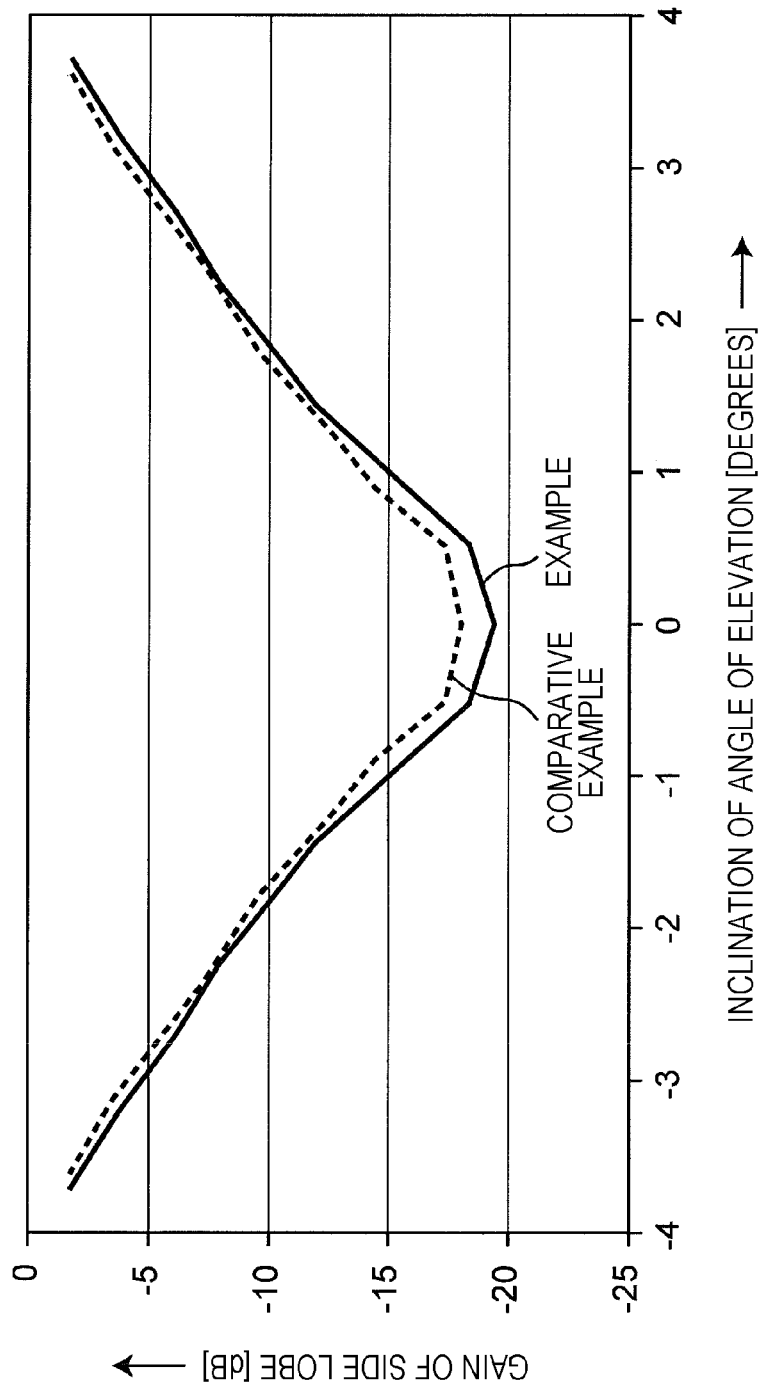
FIG. 8 is a graph showing the gain of a side lobe with respect to the inclination of an angle of elevation as simulation results according to the antenna device 10 according to the example of the first embodiment of the present disclosure and the antenna device of the comparative example.

In FIG. 8, in a case where the inclination of the angle of elevation is 0 degree, the side lobe gain (side lobe level in the Y-Z plane) of the antenna device of the comparative example is −17.5 dB, and the side lobe gain of the antenna device 10 of the example is −19.1 dB. The side lobe gain of the antenna device 10 of the example was higher in performance by −1.5 dB than the side lobe gain of the antenna device of the comparative example.

FIGS. 7 and 8 show that also in the case of a change in the direction of main lobe radiation, the antenna device 10 of the example is higher in performance than the antenna device of the comparative example.

According to these simulation results, it can be confirmed that the use of a radome 1 provided with a focusing lens structure 11 and diverging lens structures 12 and 13 is effective in improving antenna characteristics.

The antenna device 10 according to the first embodiment uses the antenna substrate 3 with the antenna element 2 formed on the upper surface of the antenna substrate 3. However, an antenna device 10 according to an embodiment of the present disclosure is not limited to this and may employ various types of antenna structure.

Second Embodiment

Figure 9:
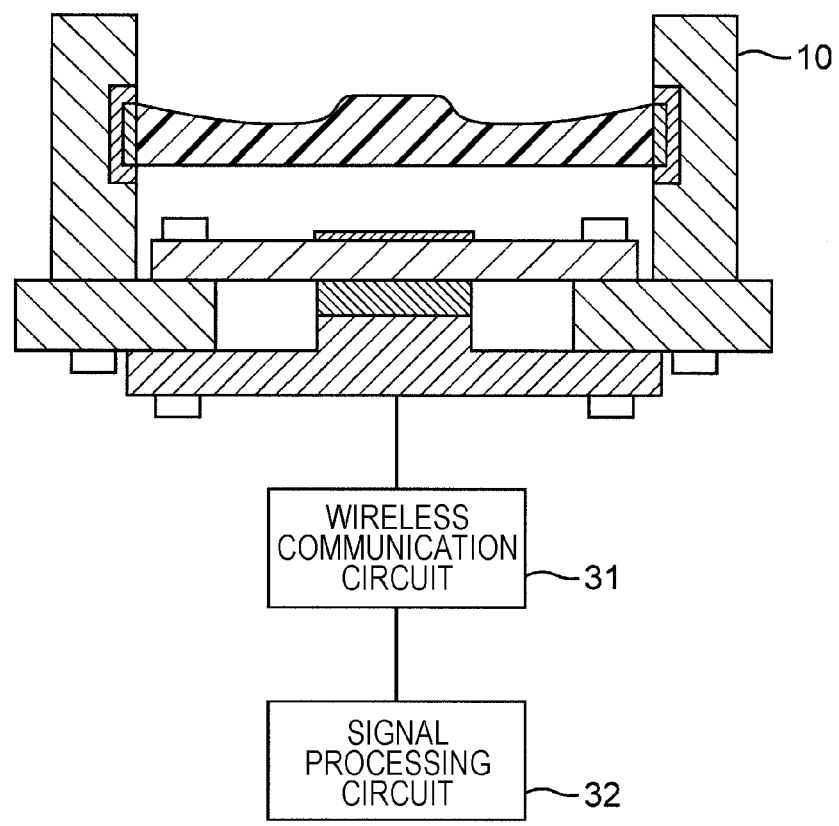
FIG. 9 shows a configuration of a wireless communication apparatus according to a second embodiment of the present disclosure.

FIG. 9 is a diagram showing a configuration of a wireless communication apparatus according to a second embodiment. The wireless communication apparatus shown in FIG. 9 includes an antenna device 10 shown in FIG. 1, a wireless communication circuit 31, and a signal processing circuit 32. The wireless communication circuit 31 emits from the antenna device 10 a radio signal produced by modulating a baseband signal sent from the signal processing circuit, and sends to the signal processing circuit 32 a baseband signal produced by demodulating a radio signal received by the antenna device 10.

Third Embodiment

Figure 10:
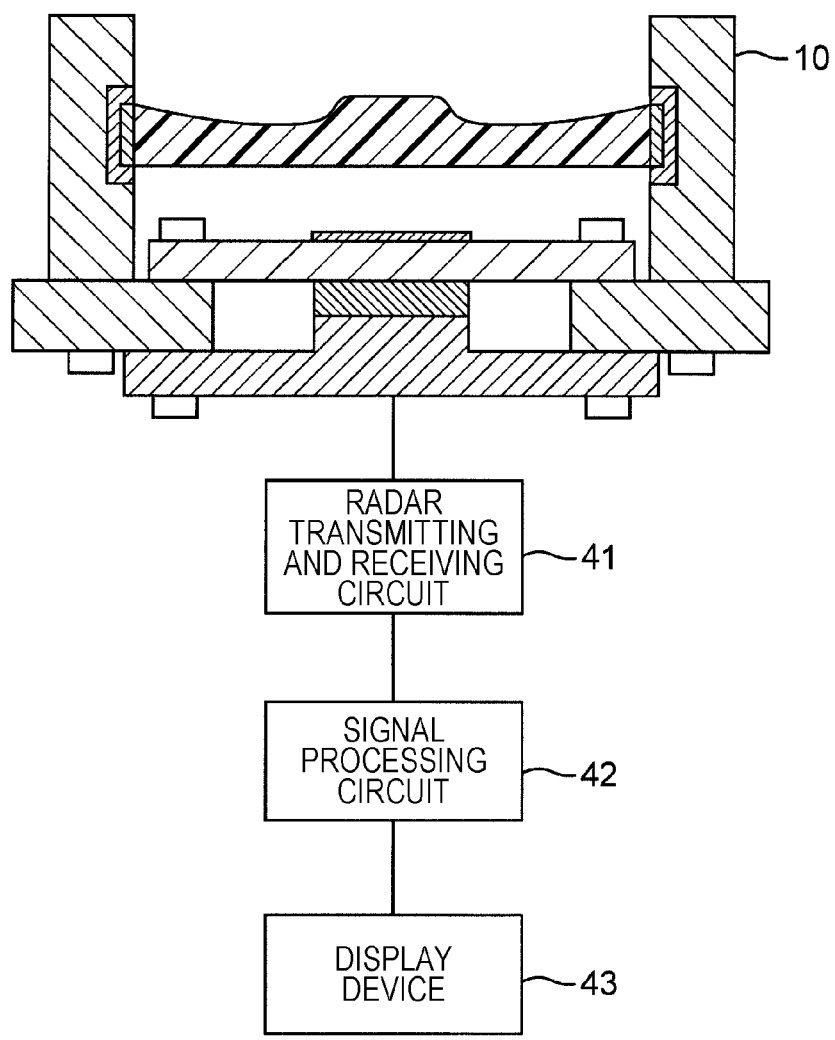
FIG. 10 shows a configuration of a radar apparatus according to a third embodiment of the present disclosure.

FIG. 10 is a diagram showing a configuration of a radar apparatus according to a third embodiment. The radar apparatus shown in FIG. 10 includes an antenna device 10 shown in FIG. 1, a radar transmitting and receiving circuit 41, a signal processing circuit 42, and a display device 43. The radar transmitting and receiving circuit 41 radiates radar waves from the antenna device 10 under control of the signal processing circuit 42 and receives radar waves reflected by the target and entering the antenna device 10. The signal processing circuit 42 determines the distance from the antenna device 10 to the target and the speed of the target, for example, on the basis of the propagation time of and a change in frequency of radar waves, and displays the results on the display device 43.

In a case where the antenna circuit 4 of the antenna device 10 is an integrated circuit, at least some of the wireless communication circuit 31, the signal processing circuit 32, the radar transmitting and receiving circuit 41, the signal processing circuit 42, and the display device 43 in the second and third embodiments may be integrated with the antenna circuit 4.

An antenna device, a wireless communication apparatus, and a radar apparatus according to aspects of the present disclosure are configured as follows.

An antenna device according to a first aspect of the present disclosure includes:

an antenna element that radiates a main lobe of a radio wave and one or more side lobes of the radio wave; and a radome through which the main lobe of the radio wave and the one or more side lobes of the radio wave, wherein the radome has a focusing lens structure that focuses the main lobe of the radio wave, and a diverging lens structure that diverges the one or more side lobes of the radio wave.

An antenna device according to a second aspect of the present disclosure is the antenna device according to the first aspect, wherein the focusing lens structure is passed through the main lobe of the radio wave propagating in a direction included in a half-value angle of the main lobe of the radio wave .

An antenna device according to a third aspect of the present disclosure is the antenna device according to the first aspect, wherein the radome has a first surface and a second surface, the first surface being closer to the antenna element than the second surface, and the focusing lens structure has a thickness set so that a first reflected main lobe and a second reflected main lobe are opposite in phase to each other, the first reflected main lobe being generated when the main lobe of the radio wave is reflected by the first surface, the second reflected main lobe being generated when the main lobe of the radio wave passes through the first surface, is reflected by the second surface, and passes through the first surface again.

An antenna device according to a fourth aspect of the present disclosure is the antenna device according to the third aspect, wherein the thickness of the focusing lens structure is set so that a phase difference between the first reflected main lobe and the second reflected main lobe is not smaller than 0.9 π and not larger than 1.1 π.

An antenna device according to a fifth aspect of the present disclosure is the antenna device according to the first aspect, wherein the diverging lens structure is passed through the one or more side lobes of the radio wave propagating in a direction included in a half-value angle of the one or more side lobes of the radio wave.

An antenna device according to a sixth aspect of the present disclosure is the antenna device according to the first aspect, wherein the radome has a first surface and a second surface, the first surface being closer to the antenna element than the second surface, and the diverging lens structure has a thickness set so that one or more first reflected side lobes and one or more second reflected side lobes are in phase with each other, the one or more first reflected side lobes being generated when the one or more side lobes of the radio wave are reflected by the first surface, the one or more second reflected side lobes being generated when the one or more side lobes of the radio wave pass through the first surface, are reflected by the second surface, and pass through the first surface again.

An antenna device according to a seventh of the present disclosure aspect is the antenna device according to the sixth aspect, wherein the thickness of the diverging lens structure is set so that a phase difference between the one or more first reflected side lobes and the one or more second reflected side lobes is not smaller than 0.3 π and not larger than 0.8 π.

An antenna device according to an eighth of the present disclosure aspect is the antenna device according to the first aspect, wherein the focusing lens structure is passed through the main lobe of the radio wave propagating in a direction included in a half-value angle of the main lobe of the radio wave, and the diverging lens structure is passed through the one or more side lobes of the radio wave propagating in a direction included in a half-value angle of the one or more side lobes of the radio wave.

An antenna device according to a ninth of the present disclosure aspect is the antenna device according to the eighth aspect, wherein the radome has a first surface and a second surface, the first surface being closer to the antenna element than the second surface, the focusing lens structure has a thickness set so that a first reflected main lobe and a second reflected main lobe are opposite in phase to each other, the first reflected main lobe being generated when the main lobe of the radio wave is reflected by the first surface, the second reflected main lobe being generated when the main lobe of the radio wave passes through the first surface, is reflected by the second surface, and passes through the first surface again, and the diverging lens structure has a thickness set so that one or more first reflected side lobes and one or more second reflected side lobes are in phase with each other, the one or more first reflected side lobes being generated when the one or more side lobes of the radio wave are reflected by the first surface, the one or more second reflected side lobes being generated when the one or more side lobes of the radio wave pass through the first surface, are reflected by the second surface, and pass through the first surface again.

An antenna device according to a tenth aspect of the present disclosure is the antenna device according to any one of the first to ninth aspects, wherein the antenna device operates in a millimeter-wave band.

A wireless communication apparatus of the present disclosure includes:
  an antenna device that receives a radio wave; and
  a wireless communication circuit that demodulates the radio wave,
    wherein the antenna device includes
    an antenna element that radiates a main lobe of a radio wave and one or more side lobes of the radio wave, and
    a radome through which the main lobe of the radio wave and the one or more side lobes of radio wave pass, and
      the radome has
      a focusing lens structure that focuses the main lobe of the radio waves, and
      a diverging lens structure that diverges the one or more side lobes of the radio wave.

A radar transmitting and receiving apparatus of the present disclosure includes:
  an antenna device that receives a radio wave reflected by a target; and
  a processing circuit that determines the distance from the antenna device to the target and the speed of the target based on the reflected radio wave,
    wherein the antenna device includes
    an antenna element that radiates a main lobe of a radio wave and one or more side lobes of the radio wave, and
    a radome through which the main lobe of the radio wave and one or more side lobes radio wave pass, and
      the radome has
      a focusing lens structure that focuses the main lobe of the radio wave p, and
      a diverging lens structure that diverges the one or more side lobe of the radio wave.

A millimeter-wave antenna device of the present disclosure is used, for example, in an on-board radar apparatus. The on-board radar apparatus is mounted in a vehicle that is a moving body and, for example, detects the azimuth, relative distance, relative speed, and the like of an obstacle such as a moving body running ahead.

The foregoing embodiments of the present disclosure have shown an example in which an on-board radar apparatus is constituted by using an antenna device according to the present disclosure. However, without being limited to this example, an antenna device according to the present disclosure may be applied to a millimeter-wave wireless communication apparatus or the like.

An antenna apparatus according to the present disclosure can be mounted in a short-range high-speed digital wireless transmission based on the WiGig standard, a wireless LAN based on the IEEE820.11ad standard, or a millimeter-wave wireless communication apparatus such as an uncompressed HD-TV video transmission, as well as in an on-board radar apparatus, and can be utilized for various purposes.

What is claimed is:
1. An antenna device comprising:
  an antenna element that, in operation, radiates a main lobe of a radio wave and one or more side lobes of the radio wave; and
  a radome through which the main lobe of the radio wave and the one or more side lobes of the radio wave pass, wherein the radome has;
a focusing lens structure that focuses the main lobe of the radio wave,
a diverging lens structure that diverges the one or more side lobes of the radio wave, and
a first surface and a second surface, the first surface being closer to the antenna element than the second surface, and
wherein a thickness of the focusing lens structure is set so that a phase difference between a first reflected main lobe and a second reflected main lobe is not smaller than $0.9\pi$ and not larger than $1.1\pi$,
the first reflected main lobe being generated when the main lobe of the radio wave is reflected by the first surface, the second reflected main lobe being generated when the main lobe of the radio wave passes through the first surface, is reflected by the second surface, and passes through the first surface again.

2. A wireless communication apparatus comprising:
the antenna device, according to claim 1; and
a wireless communication circuit that demodulates the radio wave.

3. A radar apparatus comprising:
the antenna device according to claim 1; and
a processing circuit that, in operation, determines a distance from the antenna device to a target and a speed of the target based on the reflected radio wave.

4. An antenna device comprising:
an antenna element that, in operation, radiates a main lobe of a radio wave and one or more side lobes of the radio wave; and
a radome through which the main lobe of the radio wave and the one or more side lobes of the radio wave pass,
wherein the radome has;
a focusing lens structure that focuses the main lobe of the radio wave,
a diverging lens structure that diverges the one or more side lobes of the radio wave, and
the radome has a first surface and a second surface, the first surface being closer to the antenna element than the second surface, and
wherein a thickness of the diverging lens structure is set so that a phase difference between one or more first reflected side lobes and one or more second reflected side lobes is not smaller than $0.3\pi$ and not larger than $0.8\pi$,
the one or more first reflected side lobes being generated when the one or more side lobes of the radio wave are reflected by the first surface, the one or more second reflected side lobes being generated when the one or more side lobes of the radio wave pass through the first surface, are reflected by the second surface, and pass through the first surface again.

5. A wireless communication apparatus comprising:
the antenna device according to claim 4; and
a wireless communication circuit that demodulates the radio wave.

6. A radar apparatus comprising:
the antenna device according to claim 4; and
a processing circuit that, in operation, determines a distance from the antenna device to a target and a speed of the target based on the reflected radio wave.

7. An antenna device comprising:
an antenna element that, in operation, radiates a main lobe of a radio wave and one or more side lobes of the radio wave; and
a radome through which the main lobe of the radio wave and the one or more side lobes of the radio wave pass,
wherein the radome has;
a focusing lens structure that focuses the lobe of the radio wave,
a diverging lens structure the diverges the one of more side lobes of the radio wave,
the focusing lens structure is passed through the main lobe of the radio wave propagating in a direction included in a half-value angle of the main lobe of the radio wave, and
the diverging lens structure is passed through the one or more side lobes of the radio wave propagating in direction included in a half-value angle of the one or more side lobes of the radio wave, and
wherein the radome has a first surface and a second surface, the first surface being closer to the antenna element than the second surface,
the focusing lens structure has a thickness set so that a first reflected main lobe and a second reflected main lobe are opposite in phase to each other, the first reflected main lobe being generated when the main lobe of the radio wave is reflected by the first surface, the second reflected main lobe being generated when the main lobe of the radio wave passes through the first surface, is reflected by the second surface, and passes through the first surface again, and
the diverging lens structure has a thickness set so that one or more first reflected side lobes and one or more second reflected side lobes are in phase with each other, the one or more first reflected side lobes being generated when the one or more side lobes of the radio wave are reflected by the first surface, the one or more second reflected side lobes being generated when the one or more side lobes of the radio wave pass through the first surface, are reflected by the second surface, and pass through the first surface again.

* * * * *